US012720572B2

(12) United States Patent
Van Phan et al.

(10) Patent No.: US 12,720,572 B2
(45) Date of Patent: Aug. 25, 2026

(54) SIDELINK-RELATED EVENT NOTIFICATION FOR SIDELINK GROUP VIA SIDELINK CHANNEL

(71) Applicant: Nokia Technologies Oy, Espoo (FI)

(72) Inventors: Vinh Van Phan, Oulu (FI); Ling Yu, Espoo (FI); Lianghai Ji, Aalborg (DK); Daniela Laselva, Aalborg (DK); Nuno Manuel Kiilerich Pratas, Aalborg (DK); Sudeep Hegde, Stuttgart (DE); Berthold Panzner, Munich (DE); Torsten Wildschek, Gloucester (GB)

(73) Assignee: Nokia Technologies Oy, Espoo (FI)

( * ) Notice: Subject to any disclaimer, the term of this patent is extended or adjusted under 35 U.S.C. 154(b) by 281 days.

(21) Appl. No.: 18/560,434

(22) PCT Filed: May 5, 2022

(86) PCT No.: PCT/EP2022/062115
§ 371 (c)(1),
(2) Date: Nov. 13, 2023

(87) PCT Pub. No.: WO2022/243049
PCT Pub. Date: Nov. 24, 2022

(65) Prior Publication Data

US 2024/0251429 A1 Jul. 25, 2024

Related U.S. Application Data

(60) Provisional application No. 63/201,877, filed on May 17, 2021.

(51) Int. Cl.
*H04W 72/25* (2023.01)
*H04W 76/28* (2018.01)

(52) U.S. Cl.
CPC .......... *H04W 72/25* (2023.01); *H04W 76/28* (2018.02)

(58) Field of Classification Search
CPC ....... H04W 72/25; H04W 76/28; H04W 4/06; H04W 72/20; H04W 52/0219;
(Continued)

(56) References Cited

U.S. PATENT DOCUMENTS

2020/0344722 A1 10/2020 He et al.
2021/0037468 A1 2/2021 Huang et al.
(Continued)

FOREIGN PATENT DOCUMENTS

WO 2020/222568 A1 11/2020
WO 2021/067912 A1 4/2021

OTHER PUBLICATIONS

"WID revision: NR sidelink enhancement", 3GPP TSG RAN Meeting #90e, RP-202846, Agenda: 9.8.3, LG Electronics, Dec. 7-11, 2020, 6 pages.
(Continued)

*Primary Examiner* — Ayanah S George
(74) *Attorney, Agent, or Firm* — Brake Hughes Bellermann LLP

(57) ABSTRACT

A method includes causing or detecting, by a user device that is a member of a sidelink group of user devices, a sidelink-related event that triggers an operation associated with the sidelink-related event and specific to the sidelink group; and transmitting a notification of the sidelink-related event via a sidelink group-specific resource, in order to synchronize, among user devices of the sidelink group including any user device of the sidelink group that failed to detect the sidelink-related event, the performing by the user
(Continued)

devices of the sidelink group of the operation associated with the sidelink-related event and specific to the sidelink group.

10 Claims, 8 Drawing Sheets

(58) Field of Classification Search
CPC ......... H04W 72/0446; H04W 52/0216; H04W 76/14; H04W 76/23; H04W 76/27
See application file for complete search history.

(56) References Cited

U.S. PATENT DOCUMENTS

| | | | |
|---|---|---|---|
| 2021/0050954 A1 | 2/2021 | Ryu et al. | |
| 2021/0075552 A1 | 3/2021 | Huang et al. | |
| 2022/0191793 A1* | 6/2022 | Murray | H04W 52/0232 |
| 2023/0199909 A1* | 6/2023 | Mohammad Soleymani | H04W 52/0216 370/329 |

OTHER PUBLICATIONS

"FL summary for AI 8.11.2.1—resource allocation for power saving", 3GPP TSG RAN WG1 #103-e, R1-20xxxxx, Agenda: 8.11.2.1, OPPO, Oct. 26-Nov. 13, 2020, 10 pages.
International Search Report and Written Opinion received for corresponding Patent Cooperation Treaty Application No. PCT/EP2022/062115, dated Aug. 1, 2022, 17 pages.
"SL DRX Timers", 3GPP TSG-RAN WG2 Meeting #113bis Electronic, R2-2103478, Agenda: 8.15.2, Nokia, Apr. 12-20, 2021, 3 pages.
"Further discussion on SL DRX operation", 3GPP TSG RAN WG2 Meeting #114-e, R2-2105023, Agenda: 8.15.2, Intel Corporation, May 2021, 7 pages.
"Discussion on DRX configuration and DRX timers", 3GPP TSG-RAN WG2 #114-e, R2-2104835, Agenda: 8.15.2, OPPO, May 2021, 17 pages.
"DRX Design for Sidelink Groupcast and Broadcast", 3GPP TSG-RAN WG2 Meeting #114, R2-2104751, Agenda: 8.15.2, CATT, May 19-27, 2021, 6 pages.
"Further issues on SL DRX", 3GPP TSG-RAN WG2 Meeting #116 Electronic, R2-2109812, Agenda: 8.15.2, Nokia, Nov. 1-12, 2021, 3 pages.

* cited by examiner

Example Wireless Network 130
User Device
(UE) 132
User Device
(UE) 131
Base Station
(BS)
134
Cell
136
User Device
(UE) 133
151
User Device
(UE) 135
Core
Network
150

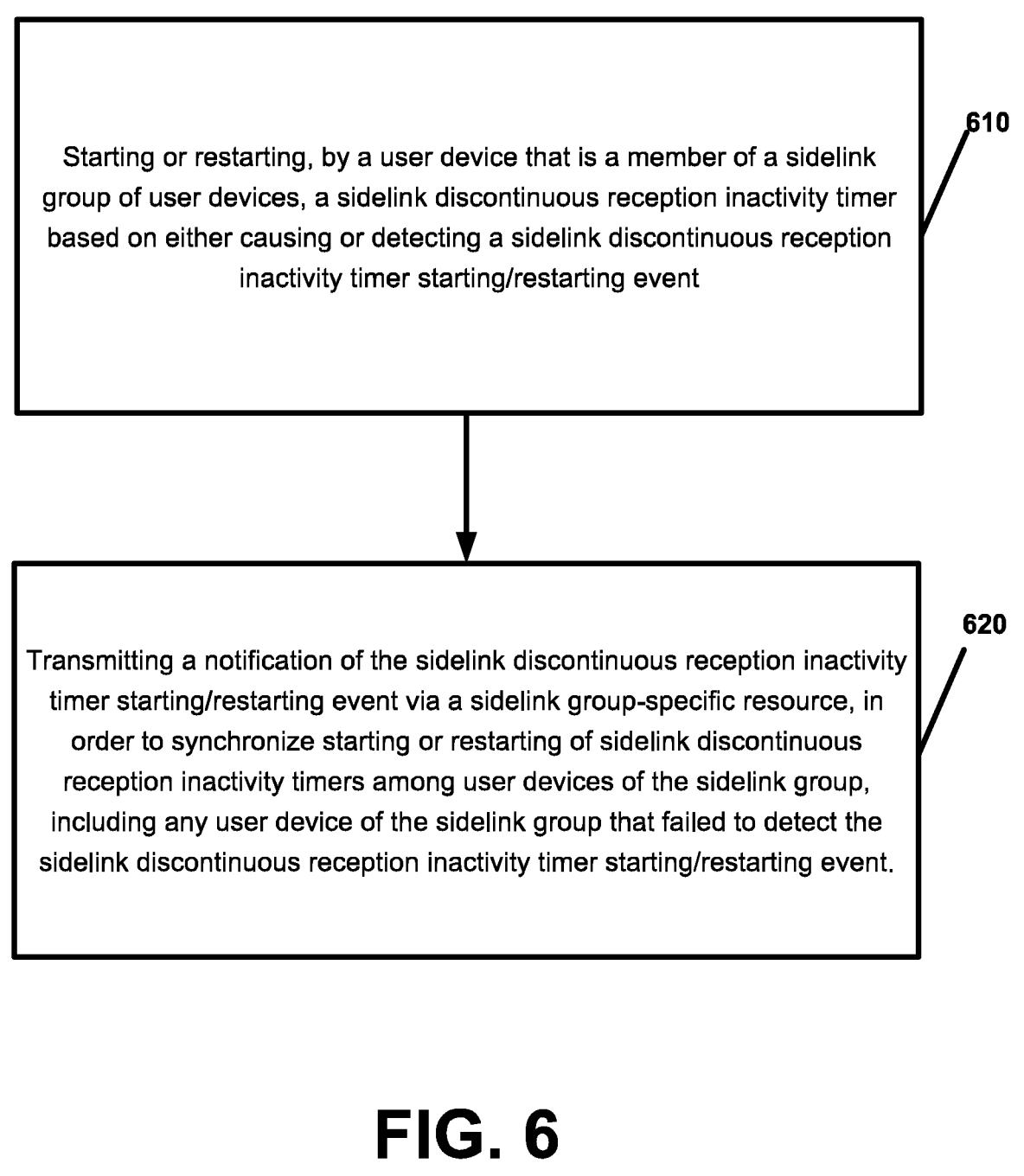

610

Starting or restarting, by a user device that is a member of a sidelink group of user devices, a sidelink discontinuous reception inactivity timer based on either causing or detecting a sidelink discontinuous reception inactivity timer starting/restarting event

620

Transmitting a notification of the sidelink discontinuous reception inactivity timer starting/restarting event via a sidelink group-specific resource, in order to synchronize starting or restarting of sidelink discontinuous reception inactivity timers among user devices of the sidelink group, including any user device of the sidelink group that failed to detect the sidelink discontinuous reception inactivity timer starting/restarting event.

FIG. 6

Figure 7:
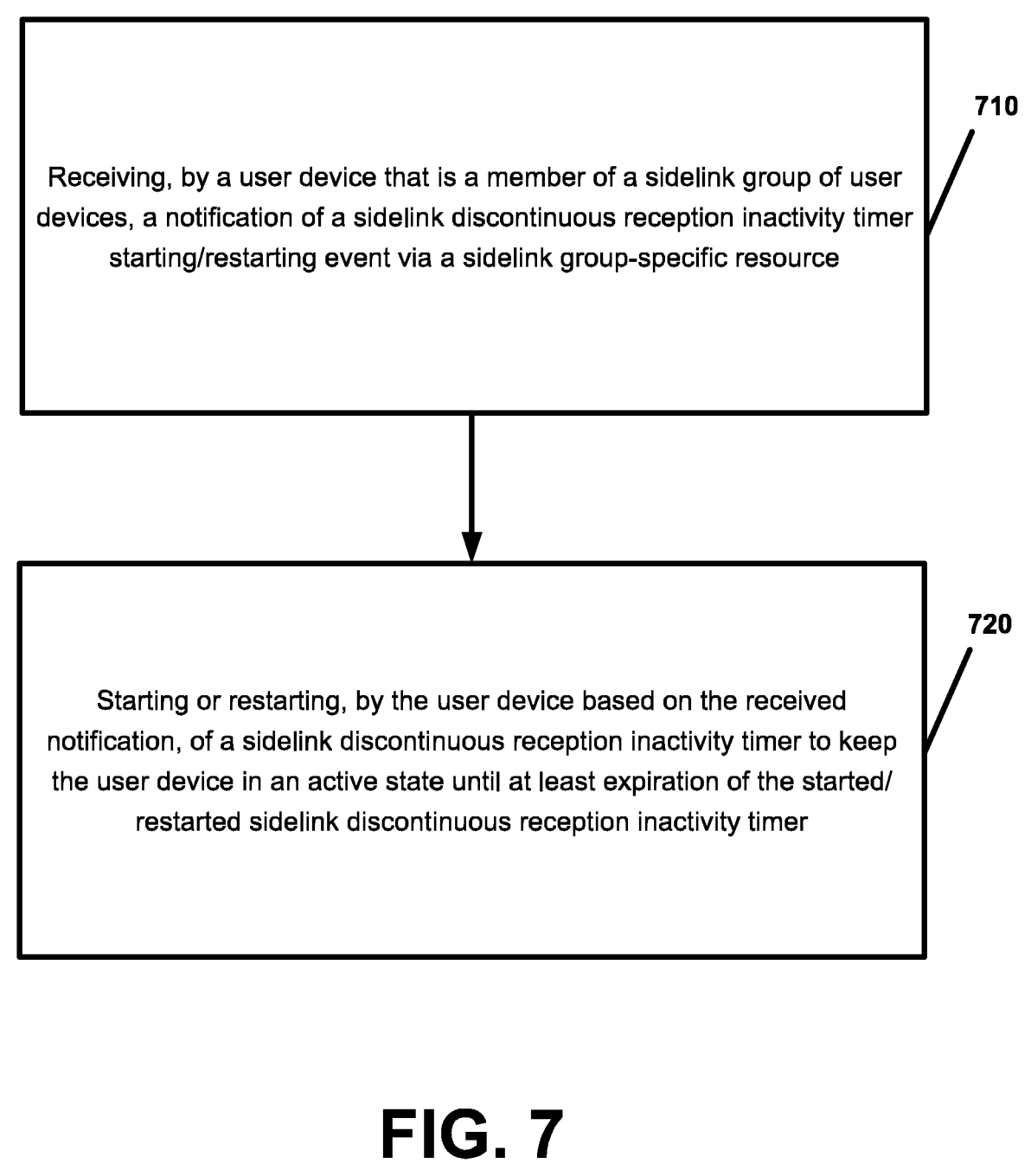

Receiving, by a user device that is a member of a sidelink group of user devices, a notification of a sidelink discontinuous reception inactivity timer starting/restarting event via a sidelink group-specific resource

710

Starting or restarting, by the user device based on the received notification, of a sidelink discontinuous reception inactivity timer to keep the user device in an active state until at least expiration of the started/restarted sidelink discontinuous reception inactivity timer

SIDELINK-RELATED EVENT NOTIFICATION FOR SIDELINK GROUP VIA SIDELINK CHANNEL

RELATED APPLICATION

This application claims priority to PCT Application No. PCT/EP2022/062115, filed on May 5, 2022, which claims priority to U.S. Provisional Application No. 63/201,877 filed May 17, 2021, each of which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IOT) and may offer new types of mission-critical services. For example, ultra-reliable and low-latency communications (URLLC) devices may require high reliability and very low latency.

SUMMARY

According to an example embodiment, a method may include causing or detecting, by a user device that is a member of a sidelink group of user devices, a sidelink-related event; and transmitting, by the user device to other user devices of the sidelink group based upon the causing or detecting, a notification of the sidelink-related event via a sidelink group-specific resource.

According to an example embodiment, a method may include determining, by a user device that is a member of a sidelink group of user devices, that the user device failed to receive a sidelink-related event that would trigger performing an operation associated with the sidelink-related event and specific to the sidelink group; and monitoring, by the user device, for a notification of the sidelink-related event via a sidelink group-specific resource.

According to an example embodiment, a method may include starting or restarting, by a user device that is a member of a sidelink group of user devices, a sidelink discontinuous reception (DRX) based on either causing or detecting a sidelink discontinuous reception inactivity timer starting/restarting event; and transmitting a notification of the sidelink discontinuous reception inactivity timer starting/restarting event via a sidelink group-specific resource, in order to synchronize starting or restarting of sidelink discontinuous reception inactivity timers among user devices of the sidelink group, including any user device of the sidelink group that failed to detect the sidelink discontinuous reception inactivity timer starting/restarting event.

According to an example embodiment, a method may include receiving, by a user device that is a member of a sidelink group of user devices, a notification of a sidelink discontinuous reception inactivity timer starting/restarting event via a sidelink group-specific resource; and starting or restarting, by the user device based on the received notification, of a sidelink discontinuous reception inactivity timer to keep the user device in an active state until at least expiration of the started/restarted sidelink discontinuous reception inactivity timer.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

BRIEF DESCRIPTION OF THE DRAWINGS

FIG. 6 is a flow chart illustrating operation of a user device (UE) that transmits a notification of a sidelink discontinuous reception inactivity timer starting/restarting event.

FIG. 7 is a flow chart illustrating operation of a user device (UE) that receives a notification of a sidelink discontinuous reception inactivity timer restarting/starting event according to an example embodiment.

DETAILED DESCRIPTION

Figure 1:
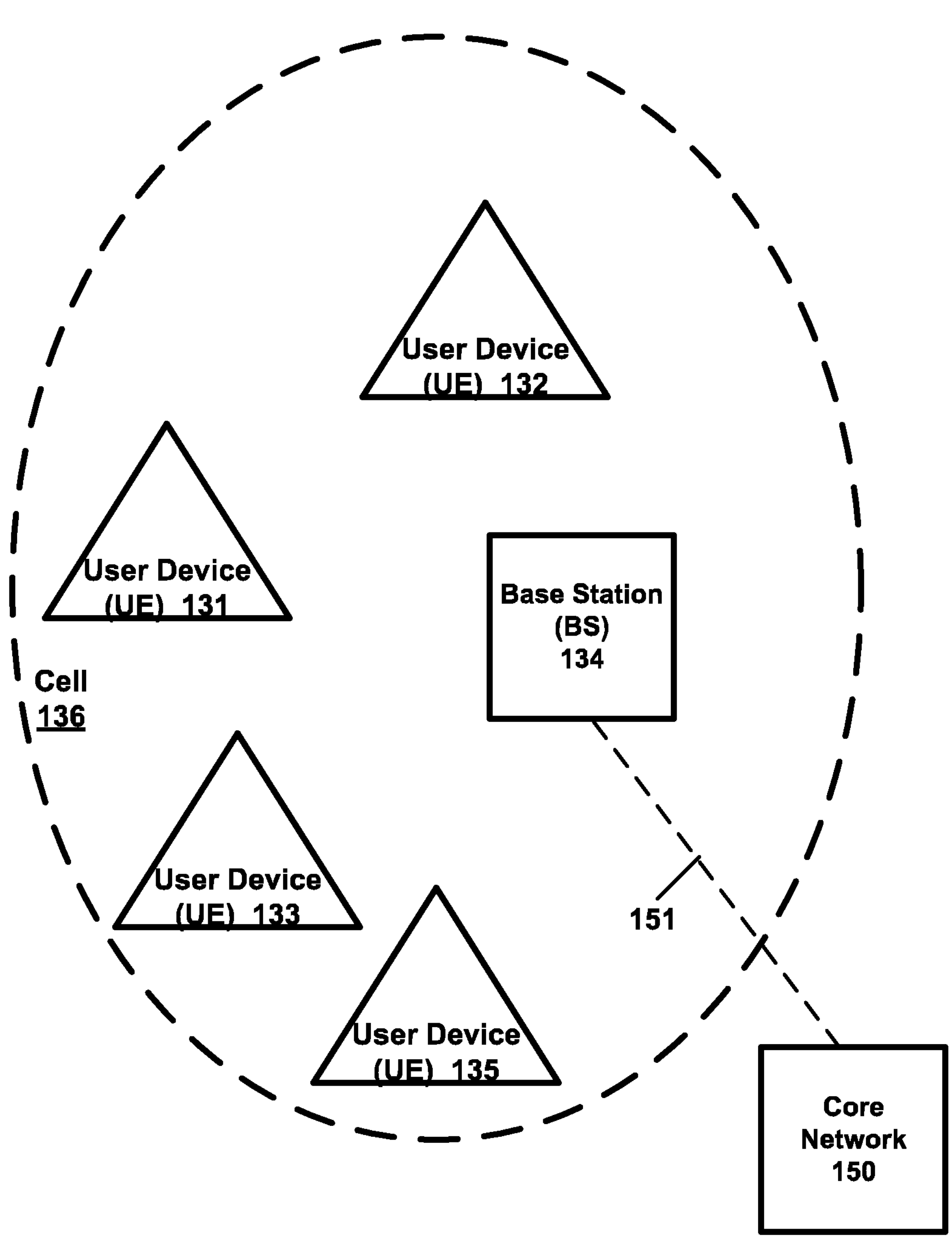
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a SI interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a/centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IOT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The techniques described herein may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

In wireless communications, transmitting and/or receiving of data for a UE (user equipment) tends to be bursty, e.g., where there may be periods of time where there is a burst of significant traffic activity for the UE, followed by a significant quiet period of time where there may be no data for transmission or reception by the UE. Thus, in order to allow the UE to conserve power, a UE may be configured for discontinuous reception (DRX). When a UE is configured for DRX, with respect to the UE-gNB radio link, the UE may monitor (e.g., receive) downlink control signals from a gNB only when in an active state, while in an inactive or sleep state the remaining time period to reduce power consumption. Thus, for example, a UE may wake up (transition from a sleep state or inactive state to an active state) at the beginning of an On duration, and may then remain in the active state during at least the On duration to receive downlink control signals and receive any data that may be scheduled for downlink transmission to the UE. In many situations, if the UE has been scheduled (for downlink data) and is actively receiving or transmitting data, it may be very likely that the UE will be scheduled again (e.g., for downlink data transmission to the UE) in the near future. In some cases, downlink data transmission to the UE may not be completed before the end of the On duration. Thus, according to an example embodiment, a UE may start or restart an inactivity timer during an On duration whenever the UE is scheduled (e.g., for uplink data transmission or for downlink data transmission). Thus, for example, the UE may then remain in an active state at least until expiration of the inactivity timer.

A UE may be a member of a sidelink (SL) group. A SL group of UEs may be a group of UEs that may communicate with each other (or which have been configured to communicate with each other) via sidelink (SL) communications. SL communications are direct communications between UEs. UEs that are members of a SL group of UEs may similarly include a sidelink (SL) discontinuous reception (DRX) inactivity timer. In some cases of a SL group, any UE may obtain SL resources and may transmit data to the other UEs of the SL group, such as via SL groupcast (or broadcast to the member UEs of the SL group). The transmitting UE may transmit scheduling information via a SL control information (SCI), and data via a SL data channel, e.g., which (both SL data and SCI) may be transmitted in the same slot in some cases. The control information transmitted via the SCI may indicate time-frequency resources scheduled for a (e.g., future) SL transmission(s) for the SL group. Thus, it may be desirable for UEs of the SL group to be (or remain) in an active state to receive such scheduled SL data transmission.

Figures 2, 3:
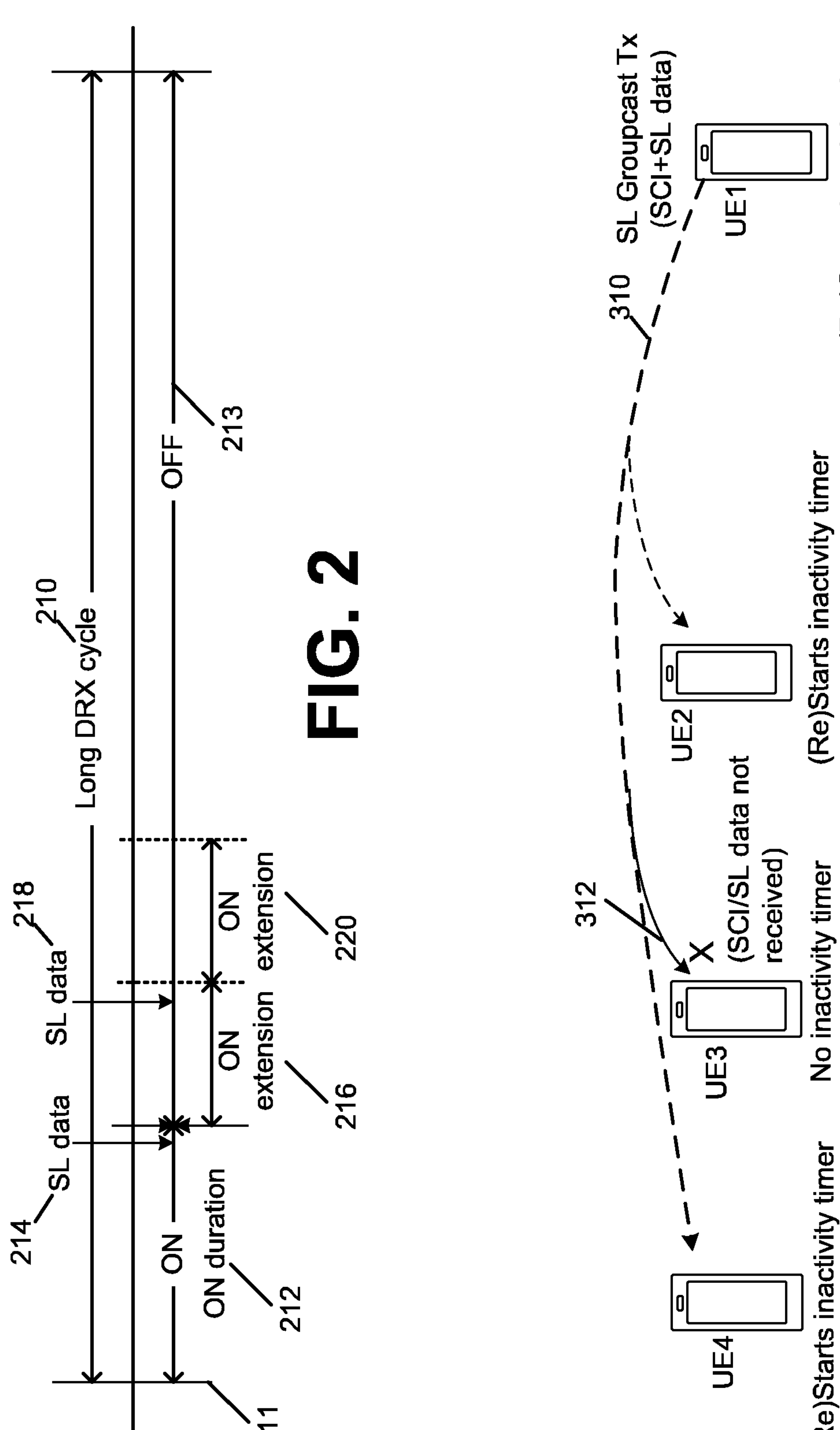
FIG. 2 is a diagram illustrating an On duration and one or more On extensions for sidelink (SL) communications according to an example embodiment.
FIG. 3 is a diagram illustrating a UE that does not receive an example sidelink discontinuous reception (DRX) inactivity timer starting/restarting event.

FIG. 2 is a diagram illustrating an On duration and one or more On extensions for sidelink (SL) communications according to an example embodiment. At the beginning (211) of the On duration 212, the UE may wake (transition from a sleep state or inactive state to an active state), and may typically remain in an active state for at least the On duration 212. While in an active state, each UE of the SL group may receive any SL data transmission(s) and may receive (or monitor and/or detect) any control information (e.g., scheduling information, including time-frequency resources of a scheduled SL transmission) transmitted via SCI. Thus, according to an example embodiment, a UE that is a member of the SL group of UEs may start or restart ((re)start) its SL DRX inactivity timer during an On duration 212 with respect to the SL group whenever the UE either transmits SCI to schedule a SL transmission for the SL group, or the UE receives SCI, indicating a scheduled SL transmission of the SL group. Thus, for example, a transmitting UE may (re)start its sidelink discontinuous reception inactivity timer upon (or based on) transmission of the SCI that schedules a SL data transmission, and other (e.g., receiving) UEs of the SL group may (re)start their SL DRX inactivity timers when they receive or detect the SCI (or detect transmitted SL data). A UE may be a member of more than one SL unicast, SL groupcast or SL broadcast group. Thus, for example, a sidelink discontinuous reception (DRX) inactivity timer for a UE may be specific to a SL group and a UE may have a different sidelink discontinuous reception inactivity timer for each SL group for which it is a member.

Thus, for example, the transmitting or receiving (or detecting) of sidelink control information (SCI) e.g., scheduling a SL transmission for (or to) the SL group, and/or transmitting and/or receiving of SL data, are examples of a SL discontinuous reception (DRX) inactivity timer starting/restarting event, that causes the UEs of the SL group to start/restart their sidelink discontinuous reception (DRX) inactivity timers. The UEs may start their SL DRX inactivity timers during the On duration (and the inactivity timer is not yet started), or may restart their SL DRX inactivity timers if already running and not expired. The UEs will remain in an active state at least until the SL DRX inactivity timer expires. If another SCI (or SL data transmission or SL control information) is transmitted while a UE's SL DRX inactivity timer is running, the UE may restart its SL DRX inactivity timer, thus extending the period of time that the UE will remain in an active state, e.g., to receive data and/or SL control information (SCI).

For example, as shown in FIG. 2, during On duration 212 (e.g., while the UEs of the SL group are in an active state), a SCI and/or SL data transmission at 214 is transmitted by one UE of the SL group and may be detected and/or received by one or more other UEs of the sidelink group. Thus, for example, the detection of this sidelink discontinuous reception (SL DRX) inactivity timer starting/restarting event (e.g., transmitting or receiving/detecting sidelink control information (SCI) that schedules a sidelink transmission for the SL group) may cause one or more UEs of the sidelink group to (re)start their SL DRX inactivity timers. The starting or restarting of a SL DRX inactivity timer may extend the On duration (or extend the period of time the UEs of the SL group should remain in an active state). Thus, for example, starting/restarting a SL DRX inactivity timer at 214 in response to a received SCI during On duration, creates an On extension 216 (or extension of the period of time that the SL UE remains in an active state). Likewise, causing or detecting a SL DRX inactivity timer starting/restarting event at 218 (e.g., based on transmission or detection (receiving) of SL control information (SCI) indicating time-frequency resources for a scheduled SL transmission) during the On extension 216 causes UE(s) to restart their SL DRX inactivity timers, thereby creating or adding an additional On extension 220, which further extends the period of time such UE(s) will remain in an active state. Thus, for example, the UE may then remain in an active state at least until expiration of the SL DRX inactivity timer. This process may continue, e.g., as long as there is data for transmission, and the UE will typically not sleep (transition from active state to an inactive or sleep state) until the SL DRX inactivity timer for the UE expires.

Thus, to summarize, the UEs (or member UEs) of a SL group wake at the beginning 211 of the On duration 212, and may typically remain in an active state for at least the On duration, to receive data that has been scheduled, and to receive (monitor and/or detect) SL control information (SCI) indicating scheduling of (or scheduled resources for) further scheduled SL transmissions for the SL group. If a UE in the SL group causes or detects a SL DRX inactivity timer starting/restarting event (e.g., based on either transmission or detection/receiving SL control information (SCI) indicating resources of further scheduled SL transmissions for the SL group of UEs), the UE may transmit a notification of the SL DRX inactivity timer starting/restarting event evet via a sidelink group-specific resource.

In some cases, there may be one or more operations associated with the SL-related event (e.g., an operation performed in response to detecting the SL-related event) and specific to (e.g., performed by the UEs of the SL group) a SL group that should be synchronized, e.g., performed at the same time or having a same or similar timing, or performed consistently among all UEs of a SL group. Some example operations associated with a sidelink-related event and specific to (or for) the SL group may include, e.g.:

1) starting or restarting, by UEs of the SL group, a SL DRX inactivity timer to keep or maintain the UE in an active state until at least expiration of the SL DRX inactivity timer. If one of the UEs (which is not synchronized with other UEs of the SL group) of a SL group incorrectly (or erroneously) transitions to a sleep state or inactive state, that UE may fail to receive data or information that may be transmitted or SL groupcast by another UE of the SL group.
2) transitioning of UEs of the SL group to a sleep state or inactive state, e.g., based on a command or control signal transmitted to the SL group. A UE that fails to receive a go-to-sleep event or inactive state event, e.g., which may be or include a command or control information instructing UEs of the SL group to transition to a sleep state or inactive state, may stay in an active state beyond what is necessary, thus causing increased power consumption, as compared to other UEs of the SL group that may have correctly received the go-to-sleep event or inactive state event (e.g., a command instructing the UE to go to sleep or transition to inactive state) and transitioned to inactive state earlier.
3) identification and/or use of a SL group-specific resource for transmitting and/or receiving data. If a new or reselected SL group-specific time-frequency resource (e.g., time-frequency resources allocated to the SL group for transmission of some type of information) is communicated to the SL group, but not received by all of the UEs of the SL group, this may cause a miscommunication between UEs of the SL group, e.g., where data or signals may be transmitted via the new or reselected SL group-specific resource, but is not received or detected by all UEs of the SL group. These are some illustrative examples where there may be a need for improved synchronization and/or improved exchange of information among UEs of a SL group, e.g., to allow operations specific to the group (group-specific operations) to be performed in a synchronized or more consistent manner among UEs of a SL group.

However, various problems may arise that may affect the operation of a SL group of UEs. For example, problems may arise if a UE of a SL group fails to detect a SL-related event that would typically trigger performing of an operation specific to (or for) the SL group.

As an example, a UE of a SL group may fail to detect the following SL-related events, by way of illustrative example (detection of each of these SL-related events may typically trigger or cause a UE to perform an operation associated with the SL-related event and specific to a SL group): 1) failure of a UE in a SL group to detect a SL DRX inactivity timer starting/restarting event (e.g., failed to receive a SL data or SCI transmission that scheduled further SL transmission(s) for the SL group, which may cause the UE not to restart its SL DRX inactivity timer); 2) failure of a UE of a SL group to detect a go-to-sleep or inactive state event for the SL group (e.g., a UE of the SL group failed to receive or detect a go-to-sleep command, or a command instructing UEs of the SL group to transition to inactive state, causing the UE to erroneously remain in active state, causing additional consumption of power); and, 3) failure by a UE of the SL group to receive or detect a sidelink group-specific resource reselection event, e.g., such as failure to detect information transmitted by one of the UEs of the SL group indicating a new or reselected group-specific resource for transmission of information for the SL group, e.g., for some purpose or function, which may lead to miscommunication among the UEs of the SL group.

Many of the examples described hereinbelow are provided with respect to the SL DRX inactivity timer starting/restarting event that may be missed (failed to detect) by one or more UEs of a SL group, but there may be other SL-related events (e.g., such as communication of a command instructing UEs of the SL group to transition to inactive state, or communication of information indicating a new or reselected group-specific resource), which may also be missed (failed to be detected by a UE of a SL group), which may also lead to problems in synchronization or communication among UEs of the SL group.

The SL On duration extension (216 and/or 218, FIG. 2), may be implemented with the SL DRX inactivity timer (e.g., an On extension, 216 and/or 218) may be provided or created by starting/restarting of a SL DRX inactivity timer. This timer may typically be started or restarted at individual UEs involved in SL communication (e.g., such as SL groupcast transmission among UEs of the SL group) upon the event of detecting that there is still SL data to transmit or an ongoing SL data transmission during a SL ON duration 212, or during an On extension 216. There is a need to synchronize the starting/restarting of SL DRX inactivity timers among UEs of a SL group, e.g., so that all UEs of the group will remain in an active state for the same period of time, so that a transmission(s) or SL groupcast to UE members of the SL group may be received by all UEs of the SL group.

As noted, a UE of SL group may, for example, detect a SL DRX inactivity timer starting/restarting event based on either transmission (for the transmitting UE of a SL group, for that particular data transmission) or detecting (detection or receiving) (for a receiving UE of the SL group, for that particular data transmission) of SL control information (SCI) indicating resources for a scheduled SL transmission to or for the SL group. Detection of this SL DRX inactivity timer starting/restarting event may trigger or cause the UE to start or restart its SL DRX inactivity timer (causing such UE to extend the period of time, via a SL On extension, that the UE will remain in an active state.

FIG. 3 is a diagram illustrating a UE that does not receive an example sidelink discontinuous reception inactivity timer starting/restarting event. As shown in FIG. 3, UE1, UE2, UE3 and UE4 are members of a SL group. UE1 performs a transmission (e.g., SL groupcast) to other UEs of the SL group, including transmission of SL control information (SCI) (indicating resources of a further scheduled SL transmission) and a SL data transmission. Based on its transmission of the SCI, UE1 (re)starts its SL DRX inactivity timer. UE2 and UE4 both receive or detect the SL transmission, including the SL data and the SCI. For example, the reception or detection of the SCI may cause UE2 and UE4 to (re)start their respective SL DRX inactivity timers. However, UE3 failed to receive or detect the SL transmission from UE1, including the SL control information (SCI). In this example, because UE2 failed to receive the SCI, UE2 does not (re)start its SL DRX inactivity timer, and may, thus, transition to inactive state before other UEs of the SL group. Thus, UE2 may fail to receive the further SL data (e.g., such as a SL groupcast) transmission that has been scheduled, but such further SL transmission is unknown (not detected) by UE2. SCI transmission is one example of a SL DRX inactivity timer starting/restarting event, but other events may cause a starting/restarting of a SL DRX inactivity timer, e.g., such as a MAC control element (or other control signal/control information) that includes an instruction (or which triggers or causes the UE to perform) to start/restart its SL DRX inactivity timer. For example, UE3 may be momentarily hidden or far away from UE1 (e.g., based on the Range or hidden node problem) and therefore fails to receive SCI from UE1 to detect the event.

Therefore, various techniques examples and/or or embodiments are described where a UE(s) of a SL group, which detects a SL-related event, transmits a notification of such SL-related event to other UEs within the SL group. This transmission of event notification to UEs within the SL group may, for example, increase the likelihood that any UE, which may not have detected the SL-related event, will receive the notification of such SL-related event from one or more other UEs of the SL group, thereby causing such UE to perform an operation associated with the SL-related event and specific to the group based on the notification of the SL-related event. As noted above, there may be one or more (or different) SL-related events (e.g., such as a SL DRX inactivity timer starting/restarting event) for which a notification may be transmitted by UEs of a SL group to the other UEs of the SL group.

The (re)starting of the SL DRX inactivity timer by a receiving UE of a SL group may be dynamic and frequent, e.g., considering the SL groupcast case where any of UE members of the SL group may transmit data to or for the SL group. There may be misalignment among UE members of the SL group in (re)starting their SL DRX inactivity timers because it is possible that some UE members of the SL group may not receive the latest SCI from a transmitting UE of the SL group that causes the (re)start of the inactivity timer at receiving UEs of the SL group that receive the latest SCI (e.g., due to range, hidden node, or half-duplex issues, which may prevent one or more UEs of the SL group from detecting the latest SCI transmission, and thus, failing to start/restart their SL DRX inactivity timers). In some cases, misalignment in (re)starting SL DRX inactivity timers among UE members of the SL group may not matter if the SL DRX inactivity timer of a UE expires before the end of the On duration 212 (FIG. 2), which may also be referred to as the sl-drx-on-DurationTimer of the SL group. This is because all UE members of the SL group will remain in an active state at least until end of the On duration 212.

However, the misalignment in (re)starting SL DRX inactivity timers will matter if the SL DRX inactivity timer is (re)started late enough during the active time of the SL group, e.g., near to the end of the active time of the SL group (e.g., near end, or within last N resources or last slot of On duration 212 or most recent On extension 216), that the SL DRX inactivity timer is still running after the end of the sl-drx-on-DurationTimer of the SL group. That is, if some UE members of the SL group missed (re)starting the inactivity timer before the end of the On duration 212, these UE members may stay active until the end of the On duration 212 and then transition to inactive state, whereas other UE members may stay active after the end of On duration, at least until the (re)started SL DRX inactivity timer expires. This may cause data losses at UE members of the SL group which missed (re)starting their inactivity timers.

Thus, a (more robust) synchronization of the SL DRX inactivity timers or the active time period extended beyond the end of On duration, referred to as On-duration extension or On extension, among all UE members of the SL group may be beneficial, e.g., to avoid data losses among member UEs.

Therefore, according to an example embodiment, after causing or detecting a SL-related event (e.g., such as a SL DRX inactivity timer starting/restarting event), a UE of a SL group may transmit an event notification for the SL-related event (e.g., where a SL-related event may include a SL inactivity starting/restarting event), which may allow other UEs within the SL group (which may not have detected the SL inactivity starting/restarting event) to be notified of the SL DRX inactivity timer starting/restarting event. A UE of the SL group which receives such event notification, may typically (and may be expected to) start or restart its SL DRX inactivity timer in response to receiving the event notification. In this manner, SL DRX inactivity timer starting/restarting synchronization may be improved for UEs of a SL group, thus, leading to fewer data losses within the SL group. The transmission of the SL inactivity starting/restarting event notification may be transmitted via a SL group-specific resource (e.g., a resource allocated to the SL group, and which may be a SL group-specific resource that is associated with the SL-related event) via a SL feedback channel, such as a SL feedback channel that may also be used for transmission of HARQ ACK/NAK feedback between UEs of the SL group.

As noted above, the SL DRX inactivity timer starting/restarting event is one example of a SL-related event that may be detected, and then an event notification may be transmitted to UEs of the SL group in order to synchronize or confirm/communicate such event among UEs of a SL group. Other SL-related events (or different event types) may be detected, and then an event notification of such SL-related event may be transmitted to UEs of the SL group, e.g., in order to synchronize the performing of an operation specific to the SL group that may be triggered based on such event. Other examples of SL-related events may include, e.g., causing or detecting of a go-to-sleep command or a command that instructs UEs of the SL group to transition to a sleep or inactive state, and/or a reselection of a SL group-specific resource.

Figure 4:
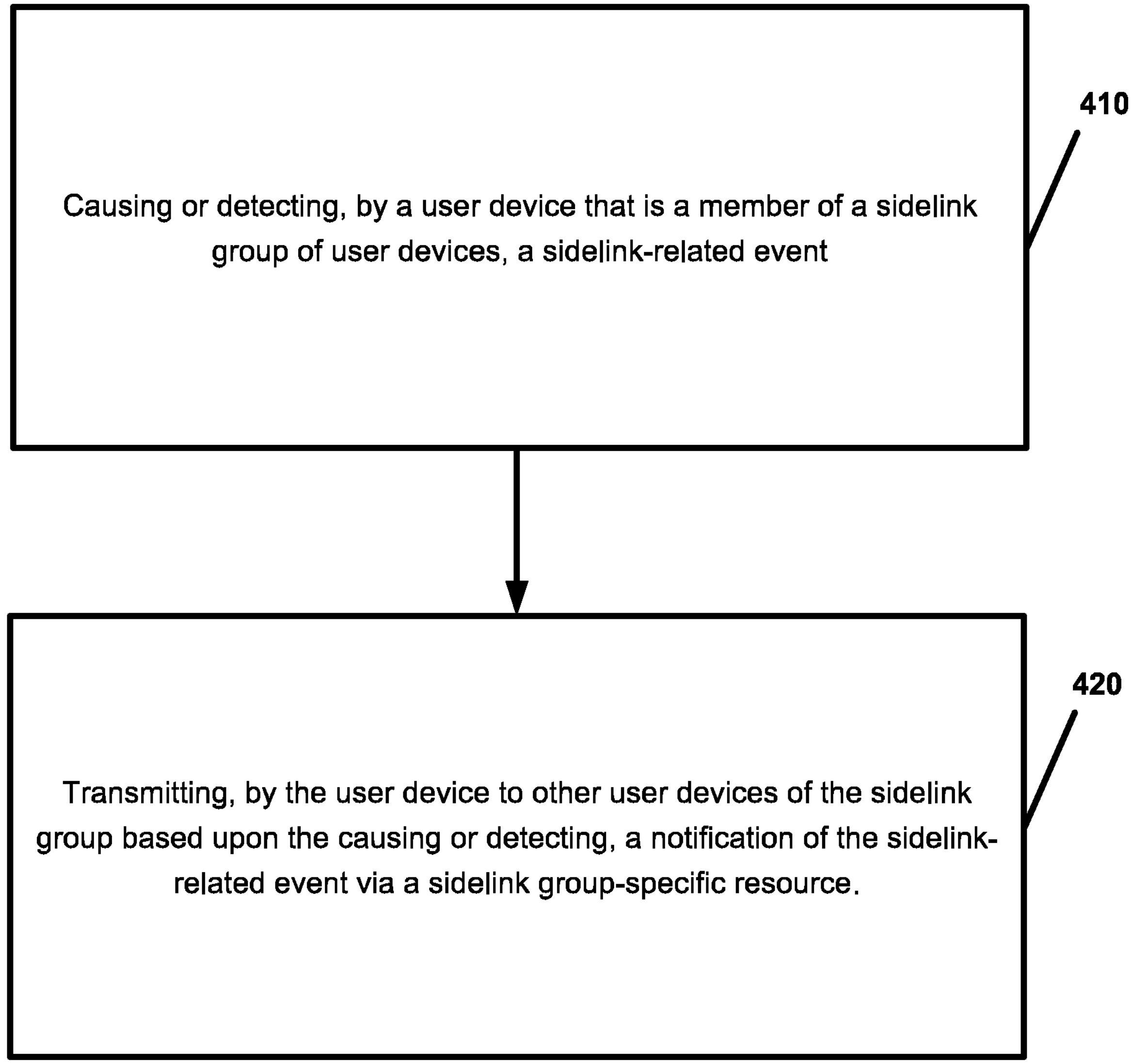
FIG. 4 is a flow chart illustrating operation of a user device (UE) that transmits a notification of a sidelink-related event according to an example embodiment.

FIG. 4 is a flow chart illustrating operation of a user device (UE) that transmits a notification of a sidelink-related event according to an example embodiment. Operation 410 includes causing or detecting, by a user device that is a member of a sidelink group of user devices, a sidelink-related event. Operation 420 includes transmitting, by the user device to other user devices of the sidelink group based upon the causing or detecting, a notification of the sidelink-related event via a sidelink group-specific resource.

The method of FIG. 4 may further include performing, by the user device based on the causing or detecting, an operation associated with the sidelink-related event and specific to the sidelink group.

For the method of FIG. 4, the transmitting a notification may include: transmitting, by the user device, a notification of the sidelink-related event via a sidelink group-specific resource, in order to synchronize, among user devices of the sidelink group including any user device of the sidelink group that failed to detect the sidelink-related event, the performing by the user devices of the sidelink group of the operation associated with the sidelink-related event and specific to the sidelink group.

For the method of FIG. 4, the sidelink group-specific resource may be a resource of a sidelink feedback channel, such as of a PSFCH channel. The sidelink group-specific resource may be associated with the sidelink-related event.

For the method of FIG. 4, the sidelink group-specific resource may be at least one of the following: a resource allocated in a predefined slot of an active time of the sidelink group for transmitting the notification of the sidelink-related event; a resource allocated in a predefined slot; a resource allocated in a last slot or a predefined slot of a discontinuous reception On duration or current On extension; and/or a resource allocated within a period before expiration of a sidelink discontinuous reception inactivity timer.

For the method of FIG. 4, the method may further include determining, by the user device, the sidelink group-specific resource allocated for transmitting the notification of the sidelink-related event.

For the method of FIG. 4, the causing or detecting a sidelink-related event may include at least one of the following: causing or detecting, by the user device, a sidelink discontinuous reception inactivity timer starting/restarting event based on either transmission or detection of sidelink control information indicating time-frequency resources for at least one scheduled sidelink transmission; causing or detecting, by the user device, a go-to-sleep or inactive state event based on either transmission or detection of a control signal with a go-to-sleep or go-to-inactive state command that instructs user devices of the sidelink group to transition to a sleep state or inactive state; causing or detecting a sidelink group-specific resource reselection event.

For the method of FIG. 4, the transmitting a notification may include at least one of: transmitting, by the user device, a notification of a sidelink discontinuous reception inactivity timer starting/restarting event via a sidelink group-specific resource of a sidelink feedback channel, in order to synchronize starting or restarting of sidelink discontinuous reception inactivity timers among user devices of the sidelink group, including any user device of the sidelink group that failed to detect a sidelink discontinuous reception inactivity timer starting/restarting event; transmitting, by the user device, a notification of a go-to-sleep or inactive state event via a sidelink group-specific resource of a sidelink feedback channel, in order to synchronize transitioning to a sleep state or inactive state among user devices of the sidelink group, including any user device of the sidelink group that failed to detect a go-to-sleep or inactive state event; or transmitting, by the user device, a notification of a sidelink group-specific resource reselection event via a sidelink group-specific resource of a sidelink feedback channel, in order to synchronize the use of reselected group-specific resource among user devices of the sidelink group, including any user device of the sidelink group that failed to detect a sidelink group-specific resource reselection event.

For the method of FIG. 4, the performing the operation associated with the sidelink-related event and specific to the sidelink group may include at least one of: starting or restarting, by the user device, of a sidelink discontinuous reception inactivity timer to keep the user device in an active state until at least expiration of the started/restarted sidelink discontinuous reception inactivity timer; transitioning, by the user device, to a sleep state or inactive state; or using the reselected group-specific resource for transmitting or receiving data or signals among user devices of the sidelink group.

For the method of FIG. 4, the causing or detecting a sidelink-related event may include causing or detecting, by the user device, a sidelink discontinuous reception inactivity timer starting/restarting event; and wherein the transmitting a notification of the sidelink-related event comprises transmitting, by the user device, a notification of the sidelink discontinuous reception inactivity timer starting/restarting event via a sidelink group-specific resource of a sidelink feedback channel, in order to synchronize starting or restarting of sidelink discontinuous reception inactivity timers among user devices of the sidelink group, including any user device of the sidelink group that failed to detect the sidelink discontinuous reception inactivity timer starting/restarting event; and wherein performing, by the user device, the operation associated with the sidelink-related event and specific to the sidelink group comprises starting or restarting, by the user device, of a sidelink discontinuous reception inactivity timer to keep the user device in an active state until at least expiration of the started/restarted sidelink discontinuous reception inactivity timer.

For the method of FIG. 4, the causing or detecting a sidelink-related event may include causing or detecting, by the user device, a go-to-sleep event or inactive state event based on either transmission or detection of a control signal with a go-to-sleep or go-to-inactive state command that instructs user devices of the sidelink group to transition to a sleep state or inactive state; wherein the transmitting a notification of the sidelink-related event comprises transmitting, by the user device, a notification of the go-to-sleep event or inactive state event via a sidelink group-specific resource of a sidelink feedback channel, in order to synchronize transitioning to a sleep state or inactive state among user devices of the sidelink group, including any user device of the sidelink group that failed to detect the go-to-sleep event or inactive state event; and wherein performing, by the user device, the operation associated with the sidelink-related event and specific to the sidelink group comprises transitioning, by the user device, to a sleep state or inactive state.

For the method of FIG. 4, the causing or detecting a sidelink-related event may include detecting, by the user device, a sidelink group-specific resource reselection event that triggers or causes the user device to reselect a group-specific resource; wherein the transmitting a notification of the sidelink-related event comprises transmitting, by the user device, a notification of the reselected group-specific resource; and wherein performing, by the user device, the operation associated with the sidelink-related event and specific to the sidelink group comprises using the reselected group-specific resource for transmitting or receiving data or signals among or between user devices of the sidelink group.

For the method of FIG. 4, the detecting, by the user device, a sidelink group-specific resource reselection event may include: detecting, or receiving an indication of detection, of collisions on the sidelink group-specific resource of the sidelink feedback channel; and determining a new or reselected sidelink group-specific resource of the sidelink feedback channel.

For the method of FIG. 4, the sidelink feedback channel may include a physical sidelink feedback channel (PSFCH).

For the method of FIG. 4, the method may further include avoiding, by the user device, transmitting or receiving HARQ ACK/NAK feedback for sidelink communications, via the sidelink group-specific time-frequency resource of the sidelink feedback channel.

Figure 5:
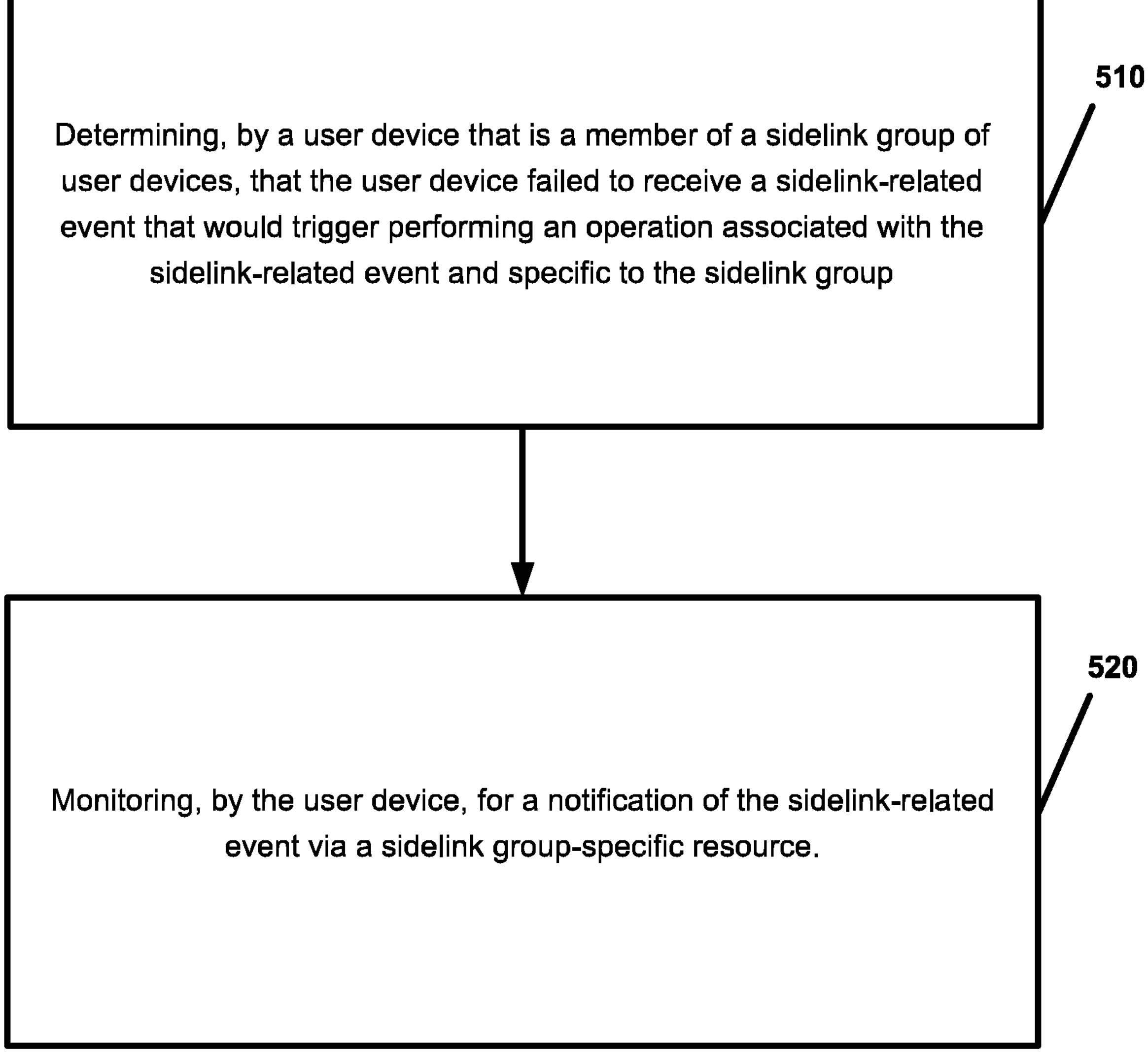
FIG. 5 is a flow chart illustrating operation of a user device (UE) that receives a notification of a sidelink-related event according to an example embodiment.

FIG. 5 is a flow chart illustrating operation of a user device (UE) that receives a notification of a sidelink-related event according to an example embodiment. Operation 510 includes determining, by a user device that is a member of a sidelink group of user devices, that the user device failed to receive a sidelink-related event that would trigger performing an operation associated with the sidelink-related event and specific to the sidelink group. And, operation 520 includes monitoring, by the user device, for a notification of the sidelink-related event via a sidelink group-specific resource. Monitoring may include, e.g., detecting and/or decoding, and/or attempting to decode or detect a particular signal, message or information.

For the method of FIG. 5, the determining that the user devices failed to receive may include: determining, by the user device, that the user device did not receive the sidelink-related event, within either a time period or on specific time-frequency resources allocated for transmission of the sidelink-related event. For the method of FIG. 5, the monitoring may include: monitoring, or attempting to detect, information in a message or a signal that includes a notification of the sidelink-related event.

For the method of FIG. 5, the method may include receiving, by the user device based on the monitoring, the notification of the sidelink-related event via a sidelink group-specific resource; and performing, by the user device based on the received notification, the operation associated with the sidelink-related event and specific to the sidelink group.

For the method of FIG. 5, the user device may be configured with one or more sidelink group-specific resources for monitoring sidelink-related event notifications; and/or the user device is configured with one or more sidelink group-specific resources associated with one or more sidelink-related event notifications.

For the method of FIG. 5, the receiving the notification may include: receiving, by the user device, a notification of the sidelink-related event via a sidelink group-specific resource, in order to synchronize, among user devices of the sidelink group including any user device of the sidelink group that failed to detect the sidelink-related event, the performing by the user devices of the sidelink group of the operation associated with the sidelink-related event and specific to the sidelink group.

For the method of FIG. 5, the sidelink group-specific resource may be of a sidelink feedback channel that is also used to provide HARQ feedback. Also, the sidelink group-specific resource may be associated with the sidelink-related event. Also, the sidelink group-specific resource may be at least one of the following: a resource allocated in a predefined slot of an active time of the sidelink group for transmitting the notification of the sidelink-related event; a resource allocated in a predefined slot; a resource allocated in a last slot or a predefined slot of an On duration or current On extension; and/or a resource allocated within a period before expiration of a sidelink discontinuous reception inactivity timer.

For the method of FIG. 5, the receiving a notification may be at least one of: receiving, by the user device, a notification of a sidelink discontinuous reception inactivity timer starting/restarting event via a sidelink group-specific resource of a sidelink feedback channel, in order to synchronize starting or restarting of sidelink discontinuous reception inactivity timers among user devices of the sidelink group, including any user device of the sidelink group that failed to detect a sidelink discontinuous reception inactivity timer starting/restarting event; receiving, by the user device, a notification of a go-to-sleep or inactive state event via a sidelink group-specific resource of a sidelink feedback channel, in order to synchronize transitioning to a sleep state or inactive state among user devices of the sidelink group, including any user device of the sidelink group that failed to detect a go-to-sleep or inactive state event; or receiving, by the user device, a notification of a sidelink group-specific resource reselection event via a sidelink group-specific resource of a sidelink feedback channel, in order to synchronize the use of reselected group-specific resource among user devices of the sidelink group, including any user device of the sidelink group that failed to detect a sidelink group-specific resource reselection event.

For the method of FIG. 5, the performing the operation associated with the sidelink-related event and specific to the sidelink group comprises at least one of: starting or restarting, by the user device, of a sidelink discontinuous reception inactivity timer to keep the user device in an active state until at least expiration of the started/restarted sidelink discontinuous reception inactivity timer; transitioning, by the user device, to a sleep state or inactive state; or using the reselected group-specific resource for transmitting or receiving data or signals among user devices of the sidelink group.

FIG. 6 is a flow chart illustrating operation of a user device (UE) that transmits a notification of a sidelink discontinuous reception inactivity timer starting/restarting event. Operation 610 includes starting or restarting, by a user device that is a member of a sidelink group of user devices, a sidelink discontinuous reception inactivity timer based on either causing or detecting a sidelink discontinuous reception inactivity timer starting/restarting event; and transmitting a notification of the sidelink discontinuous reception inactivity timer starting/restarting event via a sidelink group-specific resource, in order to synchronize starting or restarting of sidelink discontinuous reception inactivity timers among user devices of the sidelink group, including any user device of the sidelink group that failed to detect the sidelink discontinuous reception inactivity timer starting/restarting event.

For the method of FIG. 6, the transmitting may include: transmitting a notification of the sidelink discontinuous reception inactivity timer starting/restarting event via a sidelink group-specific resource of a sidelink feedback channel. Also, the method of FIG. 6 may include remaining, by the user device, in an active state at least until expiration of the started or restarted sidelink discontinuous reception inactivity timer of the user device.

For the method of FIG. 6, the starting or restarting may include: starting or restarting, by the user device, a sidelink discontinuous reception (DRX) inactivity timer based on a transmission of sidelink control information (SCI) that indicates time-frequency resources for one or more sidelink transmissions.

For the method of FIG. 6, the starting or restarting may include: starting or restarting, by a user device within a sidelink group of user devices, a sidelink discontinuous reception inactivity timer based on detection of a received sidelink control information (SCI) that indicates time-frequency resources for one or more sidelink transmissions.

For the method of FIG. 6, the method may include determining, by the user device, the sidelink group-specific resource to be used for transmission, by one or more user devices of the sidelink group, of the notification of the sidelink discontinuous reception inactivity timer starting/restarting event. Also, the sidelink feedback channel may include a physical sidelink feedback channel (PSFCH). The method may further include avoiding, by the user device, transmitting or receiving HARQ ACK/NAK feedback for sidelink communications, via the sidelink group-specific time-frequency resource of the sidelink feedback channel.

For the method of FIG. 6, the method may include: transmitting, by the user device, sidelink data to the sidelink group of user devices in which HARQ ACK/NAK feedback is configured on resources that conflict or at least partially overlap with the sidelink group-specific time-frequency resource of the sidelink feedback channel used for transmission of the notification of the sidelink discontinuous reception inactivity timer starting/restarting event; and transmitting, by the user device to user devices of the sidelink group, information indicating that HARQ feedback has been disabled for such transmitting or retransmitting of sidelink data.

For the method of FIG. 6, the method may include prioritizing, by the user device, monitoring of the sidelink group-specific time-frequency resource of the sidelink feedback channel for the notification of the sidelink discontinuous reception inactivity timer starting/restarting event, over, or instead of, monitoring for HARQ feedback on resources that are the same or overlapping with the sidelink group-specific time-frequency resource of the sidelink feedback channel.

The method of FIG. 6 may include the user device performing the following: detecting, or receiving an indication of detection, of collisions on the sidelink group-specific time-frequency resource; and determining new or reselected sidelink group-specific time-frequency resource for transmission of a notification of the sidelink discontinuous reception inactivity timer starting/restarting event.

For the method of FIG. 6, the determining new or reselected sidelink group-specific time-frequency resource for transmission of a notification of the sidelink discontinuous reception inactivity timer starting/restarting event may include at least one of: selecting a new or reselected sidelink group-specific time-frequency resource, among a pool of resources, and notifying other user devices within the sideling group of the new sidelink group-specific time-frequency resource; or determining the new or reselected sidelink group-specific time-frequency resource based on an identifier associated with the sidelink group.

FIG. 7 is a flow chart illustrating operation of a user device (UE) that receives a notification of a sidelink discontinuous reception (SL DRX) inactivity timer restarting/starting event according to an example embodiment. Operation 710 includes receiving, by a user device that is a member of a sidelink group of user devices, a notification of a sidelink discontinuous reception inactivity timer starting/restarting event via a sidelink group-specific resource. And, operation 720 includes starting or restarting, by the user device based on the received notification, of a sidelink discontinuous reception inactivity timer to keep the user device in an active state until at least expiration of the started/restarted sidelink discontinuous reception inactivity timer.

For the method of FIG. 7, the receiving may include: determining, by the user device, that the user device failed to receive a sidelink-related event; and receiving, by the user device from another user device of the sidelink group, a notification of the sidelink discontinuous reception inactivity timer starting/restarting event. Also, the receiving a notification may include: receiving, by a user device that is a member of a sidelink group of user devices, a notification of a sidelink discontinuous reception inactivity timer starting/restarting event via a sidelink group-specific resource of a sidelink feedback channel.

For the method of FIG. 7, the receiving a notification may include: receiving, by a user device that is a member of a sidelink group of user devices, a notification of a sidelink discontinuous reception inactivity timer starting/restarting event via a sidelink group-specific resource of a sidelink feedback channel that is also used to provide HARQ feedback, in order to synchronize, among user devices of the sidelink group, including any user device of the sidelink group that failed to detect the sidelink discontinuous reception inactivity timer starting/restarting event, the starting or restarting of a sidelink discontinuous reception inactivity timer.

Further examples and illustrative embodiments will be described.

By using a group-specific SL feedback channel (e.g., physical sidelink feedback channel (PSFCH)) resource for sending an event notification indication/signal in SL groupcast to allow all group member UEs to synchronize with the corresponding event-triggered group-wise operation, the example embodiments may provide the following:

A group-specific PSFCH resource is configured and associated to one or more specified event(s), so that all UE members of the SL group can determine the allocation of such group-specific PSFCH resource depending on the corresponding event which may be expected, based on specified rules. For example:

For the ON-duration/ON-time extension event or the go-to-sleep event, the group-specific PSFCH resource can be allocated in the last slot of the SL DRX ON duration or n-th slots after the last slot of the SL DRX ON duration (e.g., to ensure that the last slot of the SL DRX ON duration 212 can be used for normal PSFCH feedback). For an event caused by persistent false alarms or collisions, the group-specific PSFCH resource can, for example, be allocated in the last slot of a detection time window or k-th slots after the last slot of the detection time window. The detection time window can be one or multiple system frames or even SL DRX cycles.

To solve the range-or-hidden-node issue, a UE sidelink group member which has caused or is causing an event and/or a UE sidelink group member which has detected the event is configured to send the event notification indication/signal on the group-specific PSFCH resource allocated for the given event, resulting in a single-frequency-network (SFN) type transmission when multiple UEs perform this action simultaneously. UE group member(s) which have not detected the event are configured to monitor for an expectable event notification on the allocated group-specific PSFCH resource. See FIG. 8, which illustrates the example signaling.

To solve the half-duplex issue with the event notification transmitted on the corresponding group-specific PSFCH resource, the UE group members may be configured to avoid transmitting or receiving HARQ feedback at the same time (slot/symbol(s)) as that of the allocated group-specific PSFCH resource (for transmission of the event notification).

All UEs that transmit the event notification assume that the ON-duration/ON-time will be extended. All UEs that are unable to monitor the configured group-specific PSFCH resource due to other operations in PC5 or Uu (UE-gNB interface), may assume that the event notification was transmitted and apply the ON-duration/On-time extension.

Figure 8:
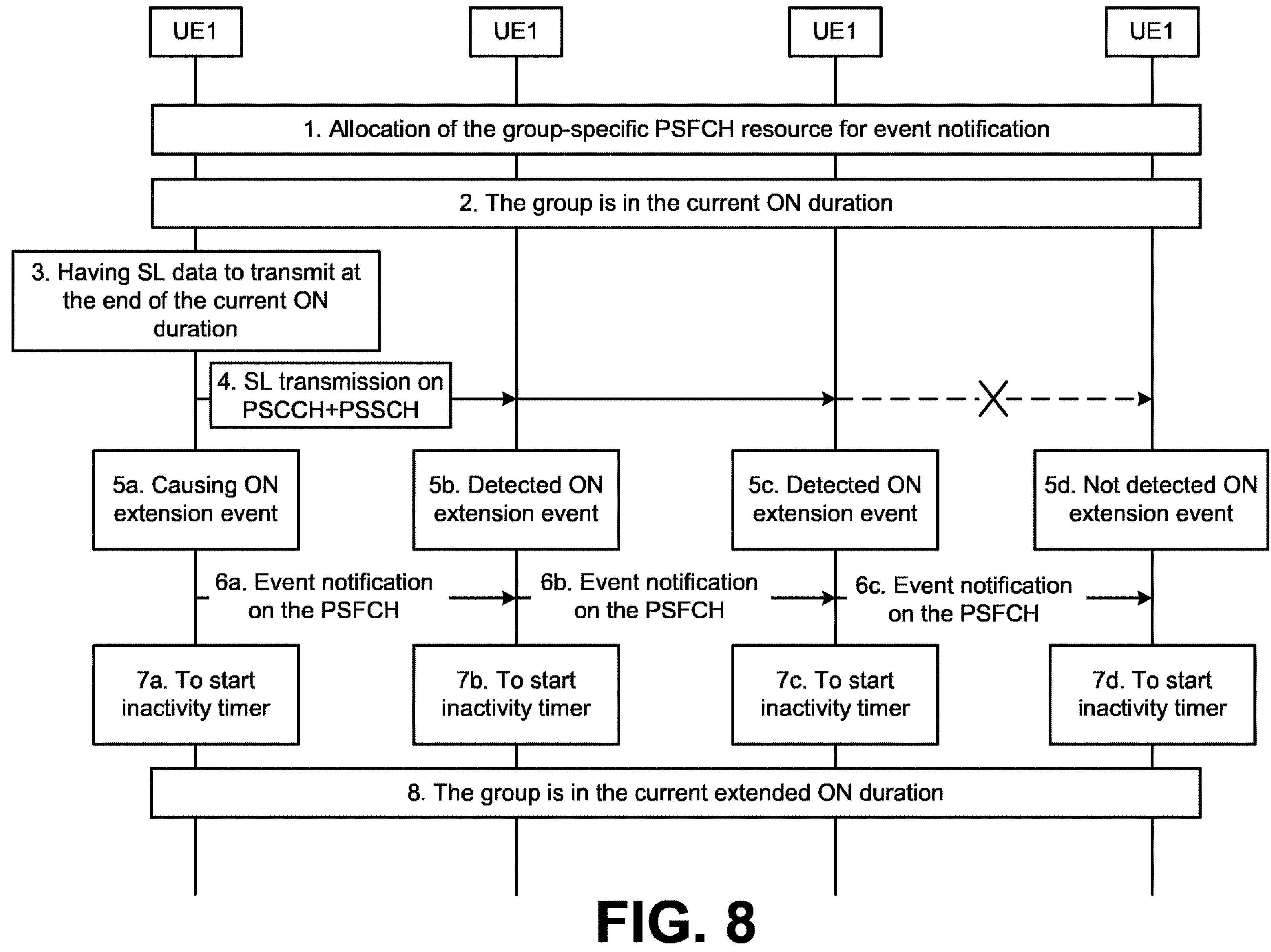
FIG. 8 is a diagram illustrating operation of user devices (UEs) of a sidelink group according to an example embodiment.

FIG. 8 is a diagram illustrating operation of user devices (UEs) of a sidelink group according to an example embodiment. In this example, UEs (UE1, UE2, UE3, UE4) may be members of a SL group, and may be in sidelink communication. At operation 1), one of the UEs, e.g., a leader UE, may allocate a group specific resource for transmission of an event notification. At 2), the SL group is in the current On duration (212, FIG. 2). At 3), the UE1 has SL data to be transmitted at the end of the current On duration. At 4), UE1 performs a SL transmission, e.g., including a 1st-stage SL (sidelink) control information (SCI) (indicating resources for scheduled SL data transmission(s)) via a physical SL control channel (PSCCH) and a 2nd-stage SCI (indicating further transmission parameters for the scheduled SL data transmission) together with the scheduled SL data via physical SL shared channel (PSSCH), e.g., transmitted via same slot. At 5*a*), UE 1 causes an On extension event (e.g., starting/restarting SL DRX inactivity timer event, based on transmission of SCI at 4)), which creates or adds an On extension 216 (FIG. 2). At 5*b*), 5*c*) and 5*d*), UE2, UE3 and UE4 detect the On extension event (e.g., detect the SL DRX inactivity timer starting/restarting event, such as detecting the transmission of SCI). At 6*a*), 6*b*), 6*c*), UE1 (in response to transmitting SCI), UE2 and UE3 (e.g., in response to detecting or receiving the SCI) transmits an event notification to other UEs of the SL group (e.g., transmits a notification of a SL DRX inactivity timer starting/restarting event via a SL group-specific resource on physical sidelink feedback channel (PSFCH). At 7*a*, 7*b*, 7*c* and 7*d*, UE1-UE4 start their SL DRX inactivity timers, including any UEs that may not have detected the SCI, but did detect or receive the event notification (e.g., event notification of the SL DRX inactivity timer starting/restarting event). At 8), the SL group is now in the extended On duration, or the On extension 216, FIG. 2. Thus, in this example, multiple UEs of the SL group may transmit the event notification via the group-specific resource, e.g., to ensure that a UE that may have failed to receive the SCI, will (very likely) receive the event notification, and thus, will be able to start/restart their SL DRX inactivity timers. Different time-frequency resources, and using different frequency resources, may be used for the group-specific resource (PSFCH) for transmission of the event notification.

In one embodiment, Tx UE which transmits the event notification signal on the group-specific PSFCH resource needs to avoid causing HARQ feedback on PSFCH resources in conflict with the group-specific PSFCH resource to tackle at least the half-duplex issue with the event notification.

In case Tx (transmitting) UE transmits SL data for the group using feedback-enabled HARQ of which the corresponding PSFCH resources for HARQ ACK/NACK feedback is overlapping in time with the group-specific PSFCH resource, Tx UE may configure via SCI (2nd-stage SCI) at least the corresponding HARQ (re)transmission with HARQ feedback disabled. In this case, Tx UE (UE1 in FIG. 3), instead of monitoring PSFCHs for HARQ feedback, can transmit the event notification signal together with other UE members which detect the event (UE2 and UE3 in FIG. 4).

In another option, the SL group may be configured with an additional mapping rule for the group-specific PSFCH resource, in case the SL data from a groupcast transmitter (Tx) UE causes HARQ feedback to be transmitted at the same time as the group-specific PSFCH resource. This mapping is thus a conflict resolution rule, and thus allows the groupcast transmitter UE to enable HARQ feedback, which also enables the usage of the group-specific PSFCH resource.

In addition or alternatively, UE members may be configured to prioritize the transmission and/or monitoring for an event notification on the corresponding group-specific PSFCH resource over HARQ ACK/NACK transmission and over other reception of PFSCH resources (e.g., for either SL transmissions of the group or SL transmissions outside the group, e.g., other unicast/groupcast SL individual UE members may have), which may be overlapping in time.

In one example embodiment, the following events may be notified using the group-specific PSFCH resource (where the group-specific resource may be associated with a sidelink-related event and may be a resource of a SL feedback channel, for example):

- sidelink discontinuous reception (SL DRX) ON duration extension trigger, e.g., implying a (re)start of DRXInactivityTimer (a restart of the SL DRX inactivity timer) across the SL group;
- DRX Go-to-sleep command (command to UEs of SL group to transition to sleep or inactive state), e.g., which indicates the UEs should terminate an ongoing ON duration or On extension, and the instruction or permission to go to sleep or inactive state across the SL group. In this case, a SL group leader UE may cause the event by sending a go-to-sleep command (e.g., in form of a SL MAC CE indicating Go-to-sleep, or go to inactive state) to the SL group of UEs, e.g., at the end of the current SL DRX ON duration 212. UE members which receive the go-to-sleep command from the group leader UE may act as those who have detected the event and therefore send the event notification, in addition to the group leader UE. UE members which do not receive the go-to-sleep command from the group leader may monitor the event notification signal on the group-specific PSFCH resource;
- Event-triggered resource reselection for, e.g., group-specific resources for transmitting wake-up signal in SL DRX or the group-specific PSFCH resource itself upon detection of persistent false alarms or collisions caused by outsider UE(s) in proximity. In this case, UE members which have detected persistent false alarms or collisions may transmit the event notification on the corresponding group-specific PSFCH resource. The rest of the group members may monitor the event notification.

In one embodiment, different events may be discriminated based on the configured corresponding group-specific PSFCH resources in time, frequency, or code domain.

The allocation of a group-specific PSFCH resource to the group may be based on, e.g., a centralized random selection and configuration or a distributed mapping. In the former option, the group leader UE may select the group-specific PSFCH resource from a configured resource pool and configure the selected group-specific PSFCH resource to all the group members. In the latter option, individual UE members of the group may be configured to derive the allocated group-specific PSFCH resource based on e.g., the common group ID.

The same or different sequences may be defined for different event notifications (to be sent on corresponding group-specific PSFCH resource to indicate/signal corresponding event notification) or for different groups.

The same or different PSFCH resources may be allocated for different event notifications. For example, the same PSFCH resource may be used for ON extension and go-to-sleep events, as these events are alternative to one another.

In one embodiment, the event detection may include, e.g.: detecting ongoing SL transmission(s) of the group in the last N slots of the current SL DRX ON duration (implying a need for an SL DRX ON duration extension); detecting persistent false alarm or collision caused by outsider UEs in proximity on a certain group-specific resource such as the PSFCH resource itself (implying a need for reselection of the PSFCH resource).

In one embodiment, an event may be assumed as detected if: the UE is unable to monitor the PSFCH resources associated with the event indication due to another ongoing activity in PC5 (a transmission in another resource pool in a different carrier) or Uu (e.g., monitoring of a paging occasion).

Example 1. A method comprising: causing or detecting, by a user device that is a member of a sidelink group of user devices, a sidelink-related event; and transmitting, by the user device to other user devices of the sidelink group based upon the causing or detecting, a notification of the sidelink-related event via a sidelink group-specific resource.

Example 2. The method of Example 1, further comprising: performing, by the user device based on the causing or detecting, an operation associated with the sidelink-related event and specific to the sidelink group.

Example 3. The method of any of Examples 1-2, wherein the transmitting a notification comprises: transmitting, by the user device, a notification of the sidelink-related event via a sidelink group-specific resource, in order to synchronize, among user devices of the sidelink group including any user device of the sidelink group that failed to detect the sidelink-related event, the performing by the user devices of the sidelink group of the operation associated with the sidelink-related event and specific to the sidelink group.

Example 4. The method of any of Examples 1-3, wherein the sidelink group-specific resource is of a sidelink feedback channel.

Example 5. The method of any of Examples 1-4, wherein the sidelink group-specific resource is associated with the sidelink-related event.

Example 6. The method of any of Examples 1-5, wherein the sidelink group-specific resource is at least one of the following: a resource allocated in a predefined slot of an active time of the sidelink group for transmitting the notification of the sidelink-related event; a resource allocated in a predefined slot; a resource allocated in a last slot or a predefined slot of a discontinuous reception On duration or current On extension; and/or a resource allocated within a period before expiration of a sidelink discontinuous reception inactivity timer.

Example 7. The method of any of Examples 1-6, further comprising: determining, by the user device, the sidelink group-specific resource allocated for transmitting the notification of the sidelink-related event.

Example 8. The method of any of Examples 1-7, wherein the causing or detecting a sidelink-related event comprises at least one of the following: causing or detecting, by the user device, a sidelink discontinuous reception inactivity timer starting/restarting event based on either transmission or detection of sidelink control information indicating time-frequency resources for at least one scheduled sidelink transmission; causing or detecting, by the user device, a go-to-sleep or inactive state event based on either transmission or detection of a control signal with a go-to-sleep or go-to-inactive state command that instructs user devices of the sidelink group to transition to a sleep state or inactive state; causing or detecting a sidelink group-specific resource reselection event.

Example 9. The method of any of Examples 1-8, wherein the transmitting a notification comprises at least one of: transmitting, by the user device, a notification of a sidelink discontinuous reception inactivity timer starting/restarting event via a sidelink group-specific resource of a sidelink feedback channel, in order to synchronize starting or restarting of sidelink discontinuous reception inactivity timers among user devices of the sidelink group, including any user device of the sidelink group that failed to detect a sidelink discontinuous reception inactivity timer starting/restarting event; transmitting, by the user device, a notification of a go-to-sleep or inactive state event via a sidelink group-specific resource of a sidelink feedback channel, in order to synchronize transitioning to a sleep state or inactive state among user devices of the sidelink group, including any user device of the sidelink group that failed to detect a go-to-sleep or inactive state event; or transmitting, by the user device, a notification of a sidelink group-specific resource reselection event via a sidelink group-specific resource of a sidelink feedback channel, in order to synchronize the use of reselected group-specific resource among user devices of the sidelink group, including any user device of the sidelink group that failed to detect a sidelink group-specific resource reselection event.

Example 10. The method of any of Examples 2-9, wherein the performing the operation associated with the sidelink-related event and specific to the sidelink group comprises at least one of: starting or restarting, by the user device, of a sidelink discontinuous reception inactivity timer to keep the user device in an active state until at least expiration of the started/restarted sidelink discontinuous reception inactivity timer; transitioning, by the user device, to a sleep state or inactive state; or using the reselected group-specific resource for transmitting or receiving data or signals among user devices of the sidelink group.

Example 11. The method of Example 2: wherein the causing or detecting a sidelink-related event comprises causing or detecting, by the user device, a sidelink discontinuous reception inactivity timer starting/restarting event; and wherein the transmitting a notification of the sidelink-related event comprises transmitting, by the user device, a notification of the sidelink discontinuous reception inactivity timer starting/restarting event via a sidelink group-specific resource of a sidelink feedback channel, in order to synchronize starting or restarting of sidelink discontinuous reception inactivity timers among user devices of the sidelink group, including any user device of the sidelink group that failed to detect the sidelink discontinuous reception inactivity timer starting/restarting event; and wherein performing, by the user device, the operation associated with the sidelink-related event and specific to the sidelink group comprises starting or restarting, by the user device, of a sidelink discontinuous reception inactivity timer to keep the user device in an active state until at least expiration of the started/restarted sidelink discontinuous reception inactivity timer.

Example 12. The method of Example 2: wherein the causing or detecting a sidelink-related event comprises causing or detecting, by the user device, a go-to-sleep event or inactive state event based on either transmission or detection of a control signal with a go-to-sleep or go-to-inactive state command that instructs user devices of the sidelink group to transition to a sleep state or inactive state; wherein the transmitting a notification of the sidelink-related event comprises transmitting, by the user device, a notification of the go-to-sleep event or inactive state event via a sidelink group-specific resource of a sidelink feedback channel, in order to synchronize transitioning to a sleep state or inactive state among user devices of the sidelink group, including any user device of the sidelink group that failed to detect the go-to-sleep event or inactive state event; and wherein performing, by the user device, the operation associated with the sidelink-related event and specific to the sidelink group comprises transitioning, by the user device, to a sleep state or inactive state.

Example 13. The method of Example 2: wherein the causing or detecting a sidelink-related event comprises detecting, by the user device, a sidelink group-specific resource reselection event that triggers or causes the user device to reselect a group-specific resource; wherein the transmitting a notification of the sidelink-related event comprises transmitting, by the user device, a notification of a sidelink group-specific resource reselection event via a sidelink group-specific resource of a sidelink feedback channel, in order to synchronize the use of reselected group-specific resource among user devices of the sidelink group, including any user device of the sidelink group that failed to detect a sidelink group-specific resource reselection event; and wherein performing, by the user device, the operation associated with the sidelink-related event and specific to the sidelink group comprises using the reselected group-specific resource for transmitting or receiving data or signals among or between user devices of the sidelink group.

Example 14. The method of Example 13, wherein the detecting, by the user device, a sidelink group-specific resource reselection event comprises: detecting, or receiving an indication of detection, of collisions on the sidelink group-specific resource of the sidelink feedback channel; and determining a new or reselected sidelink group-specific resource of the sidelink feedback channel.

Example 15. The method of any of Examples 4-14, wherein the sidelink feedback channel comprises a physical sidelink feedback channel (PSFCH).

Example 16. The method of any of Examples 1-15, further comprising: avoiding, by the user device, transmitting or receiving HARQ ACK/NAK feedback for sidelink communications, via the sidelink group-specific time-frequency resource of the sidelink feedback channel.

Example 17. A non-transitory computer-readable storage medium comprising instructions stored thereon that, when executed by at least one processor, are configured to cause a computing system to perform the method of any of Examples 1-16.

Example 18. An apparatus comprising means for performing the method of any of Examples 1-16.

Example 19. An apparatus comprising: at least one processor; and at least one memory including computer program code; the at least one memory and the computer program code configured to, with the at least one processor, cause the apparatus at least to perform the method of any of Examples 1-16.

Example 20. An apparatus comprising: at least one processor; and at least one memory including computer program code; the at least one memory and the computer program code configured to, with the at least one processor, cause the apparatus at least to: cause or detect, by a user device that is a member of a sidelink group of user devices, a sidelink-related event; and transmit, by the user device to other user devices of the sidelink group based upon the causing or detecting, a notification of the sidelink-related event via a sidelink group-specific resource.

Example 21. A method comprising: determining, by a user device that is a member of a sidelink group of user devices, that the user device failed to receive a sidelink-related event that would trigger performing an operation associated with the sidelink-related event and specific to the sidelink group; and monitoring, by the user device, for a notification of the sidelink-related event via a sidelink group-specific resource.

Example 22. The method of Example 21, wherein the determining that the user devices failed to receive comprises: determining, by the user device, that the user device did not receive the sidelink-related event, within either a time period or on specific time-frequency resources allocated for transmission of the sidelink-related event.

Example 23. The method of Example 21, wherein the monitoring comprises: monitoring, or attempting to detect, information in a message or a signal that includes a notification of the sidelink-related event.

Example 24. The method of any of Examples 21-23, further comprising: receiving, by the user device based on the monitoring, the notification of the sidelink-related event via a sidelink group-specific resource; and performing, by the user device based on the received notification, the operation associated with the sidelink-related event and specific to the sidelink group.

Example 25. The method of any of Examples 21-24, wherein: the user device is configured with one or more sidelink group-specific resources for monitoring sidelink-related event notifications; and/or the user device is configured with one or more sidelink group-specific resources associated with one or more sidelink-related event notifications.

Example 26. The method of Example 24, wherein the receiving the notification comprises: receiving, by the user device, a notification of the sidelink-related event via a sidelink group-specific resource, in order to synchronize, among user devices of the sidelink group including any user device of the sidelink group that failed to detect the sidelink-related event, the performing by the user devices of the sidelink group of the operation associated with the sidelink-related event and specific to the sidelink group.

Example 27. The method of any of Examples 21-26, wherein the sidelink group-specific resource is of a sidelink feedback channel that is also used to provide HARQ feedback.

Example 28. The method of any of Examples 21-27, wherein the sidelink group-specific resource is associated with the sidelink-related event.

Example 29. The method of any of Examples 21-28, wherein the sidelink group-specific resource is at least one of the following: a resource allocated in a predefined slot of an active time of the sidelink group for transmitting the notification of the sidelink-related event; a resource allocated in a predefined slot; a resource allocated in a last slot or a predefined slot of an On duration or current On extension; and/or a resource allocated within a period before expiration of a sidelink discontinuous reception inactivity timer.

Example 30. The method of any of Examples 24-29, wherein the receiving a notification comprises at least one of: receiving, by the user device, a notification of a sidelink discontinuous reception inactivity timer starting/restarting event via a sidelink group-specific resource of a sidelink feedback channel, in order to synchronize starting or restarting of sidelink discontinuous reception inactivity timers among user devices of the sidelink group, including any user device of the sidelink group that failed to detect a sidelink discontinuous reception inactivity timer starting/restarting event; receiving, by the user device, a notification of a go-to-sleep or inactive state event via a sidelink group-specific resource of a sidelink feedback channel, in order to synchronize transitioning to a sleep state or inactive state among user devices of the sidelink group, including any user device of the sidelink group that failed to detect a go-to-sleep or inactive state event; or receiving, by the user device, a notification of a sidelink group-specific resource reselection event via a sidelink group-specific resource of a sidelink feedback channel, in order to synchronize the use of reselected group-specific resource among user devices of the sidelink group, including any user device of the sidelink group that failed to detect a sidelink group-specific resource reselection event.

Example 31. The method of any of Examples 24-29, wherein the performing the operation associated with the sidelink-related event and specific to the sidelink group comprises at least one of: starting or restarting, by the user device, of a sidelink discontinuous reception inactivity timer to keep the user device in an active state until at least expiration of the started/restarted sidelink discontinuous reception inactivity timer; transitioning, by the user device, to a sleep state or inactive state; or using the reselected group-specific resource for transmitting or receiving data or signals among user devices of the sidelink group.

Example 32. A non-transitory computer-readable storage medium comprising instructions stored thereon that, when executed by at least one processor, are configured to cause a computing system to perform the method of any of Examples 21-31.

Example 33. An apparatus comprising means for performing the method of any of Examples 21-31.

Example 34. An apparatus comprising: at least one processor; and at least one memory including computer program code; the at least one memory and the computer program code configured to, with the at least one processor, cause the apparatus at least to perform the method of any of Examples 21-31.

Example 35. An apparatus comprising: at least one processor; and at least one memory including computer program code; the at least one memory and the computer program code configured to, with the at least one processor, cause the apparatus at least to: determine, by a user device that is a member of a sidelink group of user devices, that the user device failed to receive a sidelink-related event that would trigger performing an operation associated with the sidelink-related event and specific to the sidelink group; and monitor, by the user device, for a notification of the sidelink-related event via a sidelink group-specific resource.

Example 36. A method comprising: starting or restarting, by a user device that is a member of a sidelink group of user devices, a sidelink discontinuous reception inactivity timer based on either causing or detecting a sidelink discontinuous reception inactivity timer starting/restarting event; and transmitting a notification of the sidelink discontinuous reception inactivity timer starting/restarting event via a sidelink group-specific resource, in order to synchronize starting or restarting of sidelink discontinuous reception inactivity timers among user devices of the sidelink group, including any user device of the sidelink group that failed to detect the sidelink discontinuous reception inactivity timer starting/restarting event.

Example 37. The method of Example 36, wherein the transmitting comprises: transmitting a notification of the sidelink discontinuous reception inactivity timer starting/restarting event via a sidelink group-specific resource of a sidelink feedback channel.

Example 38. The method of any of Examples 36-37, further comprising: remaining, by the user device, in an active state at least until expiration of the started or restarted sidelink discontinuous reception inactivity timer of the user device.

Example 39. The method of any of Examples 36-38 wherein the starting or restarting comprises: starting or restarting, by the user device, a sidelink discontinuous reception inactivity timer based on a transmission of sidelink control information (SCI) that indicates time-frequency resources for one or more sidelink transmissions.

Example 40. The method of any of Examples 36-39, wherein the starting or restarting comprises: starting or restarting, by a user device within a sidelink group of user devices, a sidelink discontinuous reception inactivity timer based on detection of a received sidelink control information (SCI) that indicates time-frequency resources for one or more sidelink transmissions.

Example 41. The method of any of Examples 36-39, further comprising:

determining, by the user device, the sidelink group-specific resource to be used for transmission, by one or more user devices of the sidelink group, of the notification of the sidelink discontinuous reception inactivity timer starting/restarting event.

Example 42. The method of any of Examples 36-41, wherein the sidelink feedback channel comprises a physical sidelink feedback channel (PSFCH).

Example 43. The method of any of Examples 36-42, further comprising:

avoiding, by the user device, transmitting or receiving HARQ ACK/NAK feedback for sidelink communications, via the sidelink group-specific time-frequency resource of the sidelink feedback channel.

Example 44. The method of any of Examples 36-43, further comprising: transmitting, by the user device, sidelink data to the sidelink group of user devices in which HARQ ACK/NAK feedback is configured on resources that conflict or at least partially overlap with the sidelink group-specific time-frequency resource of the sidelink feedback channel used for transmission of the notification of the sidelink discontinuous reception inactivity timer starting/restarting event; and transmitting, by the user device to user devices of the sidelink group, information indicating that HARQ feedback has been disabled for such transmitting or retransmitting of sidelink data.

Example 45. The method of any of Examples 36-44, further comprising: prioritizing, by the user device, monitoring of the sidelink group-specific time-frequency resource of the sidelink feedback channel for the notification of the sidelink discontinuous reception inactivity timer starting/restarting event, over, or instead of, monitoring for HARQ feedback on resources that are the same or overlapping with the sidelink group-specific time-frequency resource of the sidelink feedback channel.

Example 46. The method of any of Examples 36-45, further comprising the user device performing the following: detecting, or receiving an indication of detection, of collisions on the sidelink group-specific time-frequency resource; and determining new or reselected sidelink group-specific time-frequency resource for transmission of a notification of the sidelink discontinuous reception inactivity timer starting/restarting event.

Example 47. The method of Example 46, wherein the determining new or reselected sidelink group-specific time-frequency resource for transmission of a notification of the sidelink discontinuous reception inactivity timer starting/restarting event comprises at least one of: selecting a new or reselected sidelink group-specific time-frequency resource, among a pool of resources, and notifying other user devices within the sideling group of the new sidelink group-specific time-frequency resource; or determining the new or reselected sidelink group-specific time-frequency resource based on an identifier associated with the sidelink group.

Example 48. An apparatus comprising means for performing the method of any of Examples 36-47.

Example 49. A non-transitory computer-readable storage medium comprising instructions stored thereon that, when executed by at least one processor, are configured to cause a computing system to perform the method of any of Examples 36-47.

Example 50. An apparatus comprising: at least one processor; and at least one memory including computer program code; the at least one memory and the computer program code configured to, with the at least one processor, cause the apparatus at least to perform the method of any of Examples 36-47.

Example 51. An apparatus comprising: at least one processor; and at least one memory including computer program code; the at least one memory and the computer program code configured at least to: start or restart, by a user device that is a member of a sidelink group of user devices, a sidelink discontinuous reception inactivity timer based on either causing or detecting a sidelink discontinuous reception inactivity timer starting/restarting event; and transmit a notification of the sidelink discontinuous reception inactivity timer starting/restarting event via a sidelink group-specific resource, in order to synchronize starting or restarting of sidelink discontinuous reception inactivity timers among user devices of the sidelink group, including any user device of the sidelink group that failed to detect the sidelink discontinuous reception inactivity timer starting/restarting event.

Example 52. A method comprising: receiving, by a user device that is a member of a sidelink group of user devices, a notification of a sidelink discontinuous reception inactivity timer starting/restarting event via a sidelink group-specific resource; and starting or restarting, by the user device based on the received notification, of a sidelink discontinuous reception inactivity timer to keep the user device in an active state until at least expiration of the started/restarted sidelink discontinuous reception inactivity timer.

Example 53. The method of Example 52, wherein the receiving comprises: determining, by the user device, that the user device failed to receive a sidelink-related event; and receiving, by the user device from another user device of the sidelink group, a notification of the sidelink discontinuous reception inactivity timer starting/restarting event.

Example 54. The method of Example 52, wherein the receiving a notification comprises: receiving, by a user device that is a member of a sidelink group of user devices, a notification of a sidelink discontinuous reception inactivity timer starting/restarting event via a sidelink group-specific resource of a sidelink feedback channel.

Example 55. The method of any of Examples 52-54, wherein the receiving a notification comprises: receiving, by a user device that is a member of a sidelink group of user devices, a notification of a sidelink discontinuous reception inactivity timer starting/restarting event via a sidelink group-specific resource of a sidelink feedback channel that is also used to provide HARQ feedback, in order to synchronize, among user devices of the sidelink group, including any user device of the sidelink group that failed to detect the sidelink discontinuous reception inactivity timer starting/restarting event, the starting or restarting of a sidelink discontinuous reception inactivity timer.

Example 56. An apparatus comprising means for performing the method of any of Examples 52-55.

Example 57. A non-transitory computer-readable storage medium comprising instructions stored thereon that, when executed by at least one processor, are configured to cause a computing system to perform the method of any of Examples 52-55.

Example 58. An apparatus comprising: at least one processor; and at least one memory including computer program code; the at least one memory and the computer program code configured to, with the at least one processor, cause the apparatus at least to perform the method of any of Examples 52-55.

Figure 9:
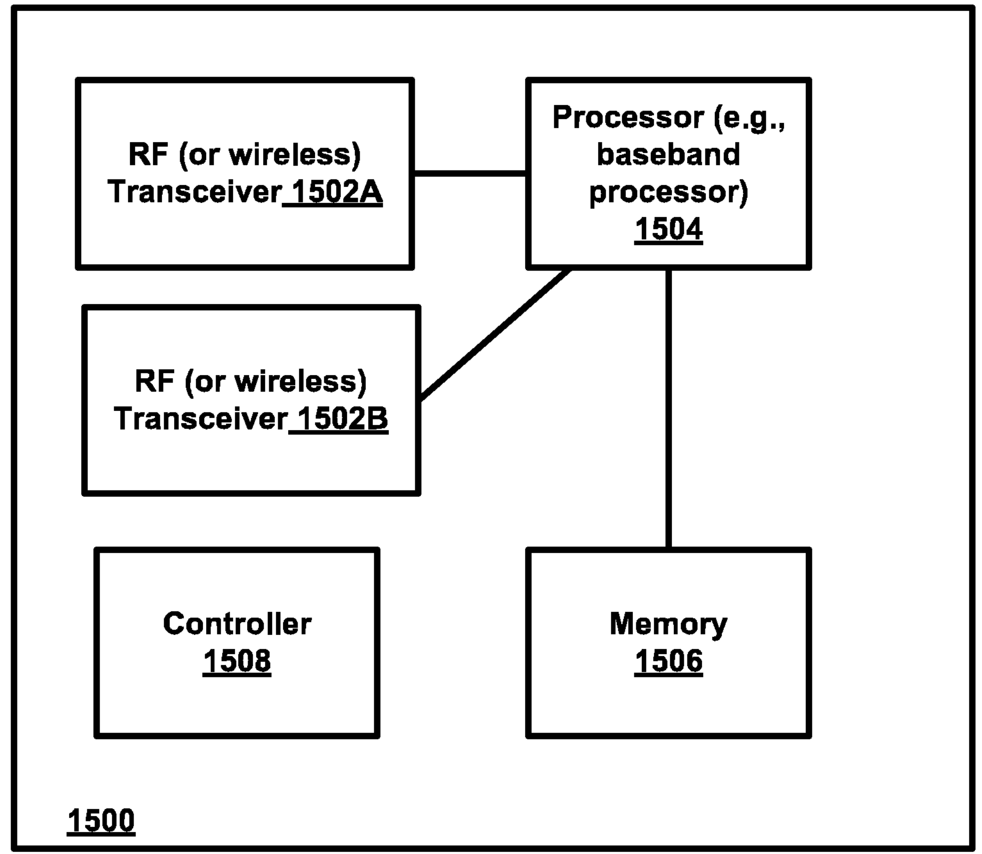
FIG. 9 is a block diagram of a wireless station or node (e.g., AP, BS, RAN node, DU UE or user device, or network node).

FIG. 9 is a block diagram of a wireless station (e.g., AP, BS or user device/UE, or other network node) 1500 according to an example embodiment. The wireless station 1500 may include, for example, one or more (e.g., two as shown in FIG. 9) RF (radio frequency) or wireless transceivers 1502A, 1502B, where each wireless transceiver includes a transmitter to transmit signals and a receiver to receive signals. The wireless station also includes a processor or control unit/entity (controller) 1504 to execute instructions or software and control transmission and receptions of signals, and a memory 1506 to store data and/or instructions.

Processor 1504 may also make decisions or determinations, generate frames, packets or messages for transmission, decode received frames or messages for further processing, and other tasks or functions described herein. Processor 1504, which may be a baseband processor, for example, may generate messages, packets, frames or other signals for transmission via wireless transceiver 1502 (1502A or 1502B). Processor 1504 may control transmission of signals or messages over a wireless network, and may control the reception of signals or messages, etc., via a wireless network (e.g., after being down-converted by wireless transceiver 1502, for example). Processor 1504 may be programmable and capable of executing software or other instructions stored in memory or on other computer media to perform the various tasks and functions described above, such as one or more of the tasks or methods described above. Processor 1504 may be (or may include), for example, hardware, programmable logic, a programmable processor that executes software or firmware, and/or any combination of these. Using other terminology, processor 1504 and transceiver 1502 together may be considered as a wireless transmitter/receiver system, for example.

In addition, referring to FIG. 9, a controller (or processor) 1508 may execute software and instructions, and may provide overall control for the station 1500, and may provide control for other systems not shown in FIG. 9, such as controlling input/output devices (e.g., display, keypad), and/or may execute software for one or more applications that may be provided on wireless station 1500, such as, for example, an email program, audio/video applications, a word processor, a Voice over IP application, or other application or software.

In addition, a storage medium may be provided that includes stored instructions, which when executed by a controller or processor may result in the processor 1504, or other controller or processor, performing one or more of the functions or tasks described above.

According to another example embodiment, RF or wireless transceiver(s) 1502A/1502B may receive signals or data and/or transmit or send signals or data. Processor 1504 (and possibly transceivers 1502A/1502B) may control the RF or wireless transceiver 1502A or 1502B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:

causing or detecting, by a user device that is a member of a sidelink group of user devices, a sidelink group-specific resource reselection event that triggers or causes the user device to reselect a group-specific resource;

determining, by the user device, the sidelink group-specific resource allocated for transmitting the notification of the sidelink-related event;

transmitting, by the user device to other user devices of the sidelink group based upon the causing or detecting, a notification of a sidelink group-specific resource reselection event via a sidelink group-specific resource of a sidelink feedback channel, in order to synchronize the use of reselected group-specific resource among user devices of the sidelink group, including any user device of the sidelink group that failed to detect a sidelink group-specific resource reselection event; and performing, by the user device, an operation associated with the sidelink-related event and specific to the sidelink group including using the reselected group-specific resource for transmitting or receiving data or signals among or between user devices of the sidelink group.

2. The method according to claim 1, wherein the sidelink group-specific resource is at least one of the following:

a resource allocated in a predefined slot of an active time of the sidelink group for transmitting the notification of the sidelink-related event;

a resource allocated in a predefined slot;

a resource allocated in a last slot or a predefined slot of a discontinuous reception On duration or current On extension; and/or a resource allocated within a period before expiration of a sidelink discontinuous reception inactivity timer.

3. The method according to claim 1:

wherein the causing or detecting a sidelink-related event comprises causing or detecting, by the user device, a go-to-sleep event or inactive state event based on either transmission or detection of a control signal with a go-to-sleep or go-to-inactive state command that instructs user devices of the sidelink group to transition to a sleep state or inactive state;

wherein the transmitting a notification of the sidelink-related event comprises transmitting, by the user device, a notification of the go-to-sleep event or inactive state event via a sidelink group-specific resource of a sidelink feedback channel, in order to synchronize transitioning to a sleep state or inactive state among user devices of the sidelink group, including any user device of the sidelink group that failed to detect the go-to-sleep event or inactive state event; and wherein performing, by the user device, the operation associated with the sidelink-related event and specific to the sidelink group comprises transitioning, by the user device, to a sleep state or inactive state.

4. The method according to claim 1, wherein the detecting, by the user device, a sidelink group-specific resource reselection event comprises:

detecting, or receiving an indication of detection, of collisions on the sidelink group-specific resource of the sidelink feedback channel; and determining a new or reselected sidelink group-specific resource of the sidelink feedback channel.

5. The method according to claim 1, further comprising:

avoiding, by the user device, transmitting or receiving HARQ ACK/NAK feedback for sidelink communications, via the sidelink group-specific time-frequency resource of the sidelink feedback channel.

6. An apparatus comprising:

at least one processor; and at least one memory including computer program code;

the at least one memory and the computer program code configured to, with the at least one processor, cause the apparatus at least to:

cause or detect, by a user device that is a member of a sidelink group of user devices, a sidelink group-specific resource reselection event that triggers or causes the user device to reselect a group-specific resource;

determine, by the user device, the sidelink group-specific resource allocated for transmitting the notification of the sidelink-related event;

transmit, by the user device to other user devices of the sidelink group based upon the causing or detecting, a notification of a sidelink group-specific resource reselection event via a sidelink group-specific resource of a sidelink feedback channel, in order to synchronize the use of reselected group-specific resource among user devices of the sidelink group, including any user device of the sidelink group that failed to detect a sidelink group-specific resource reselection event; and perform, by the user device, an operation associated with the sidelink-related event and specific to the sidelink group including using the reselected group-specific resource for transmitting or receiving data or signals among or between user devices of the sidelink group.

7. The apparatus according to claim 6, wherein the sidelink group-specific resource is at least one of the following:

a resource allocated in a predefined slot of an active time of the sidelink group for transmitting the notification of the sidelink-related event;

a resource allocated in a predefined slot;

a resource allocated in a last slot or a predefined slot of a discontinuous reception On duration or current On extension; and/or a resource allocated within a period before expiration of a sidelink discontinuous reception inactivity timer.

8. The apparatus according to claim 6:

wherein the apparatus caused to cause or detect a sidelink-related event comprises the apparatus caused to cause or detect, by the user device, a go-to-sleep event or inactive state event based on either transmission or detection of a control signal with a go-to-sleep or go-to-inactive state command that instructs user devices of the sidelink group to transition to a sleep state or inactive state;

wherein the apparatus caused to transmit comprises the apparatus caused to transmit a notification of the sidelink-related event comprises transmitting, by the user device, a notification of the go-to-sleep event or inactive state event via a sidelink group-specific resource of a sidelink feedback channel, in order to synchronize transitioning to a sleep state or inactive state among user devices of the sidelink group, including any user device of the sidelink group that failed to detect the go-to-sleep event or inactive state event; and wherein the apparatus caused to perform comprises the apparatus caused to perform, by the user device, the operation associated with the sidelink-related event and specific to the sidelink group comprises transitioning, by the user device, to a sleep state or inactive state.

9. The apparatus according to claim 6, wherein the apparatus caused to detect, by the user device, a sidelink group-specific resource reselection event comprises the apparatus caused to:

detect, or receive an indication of detection, of collisions on the sidelink group-specific resource of the sidelink feedback channel; and determine a new or reselected sidelink group-specific resource of the sidelink feedback channel.

10. The apparatus according to claim 6, wherein the apparatus is further caused to:

avoid, by the user device, transmitting or receiving HARQ ACK/NAK feedback for sidelink communications, via the sidelink group-specific time-frequency resource of the sidelink feedback channel.

* * * * *